Patented Jan. 7, 1936

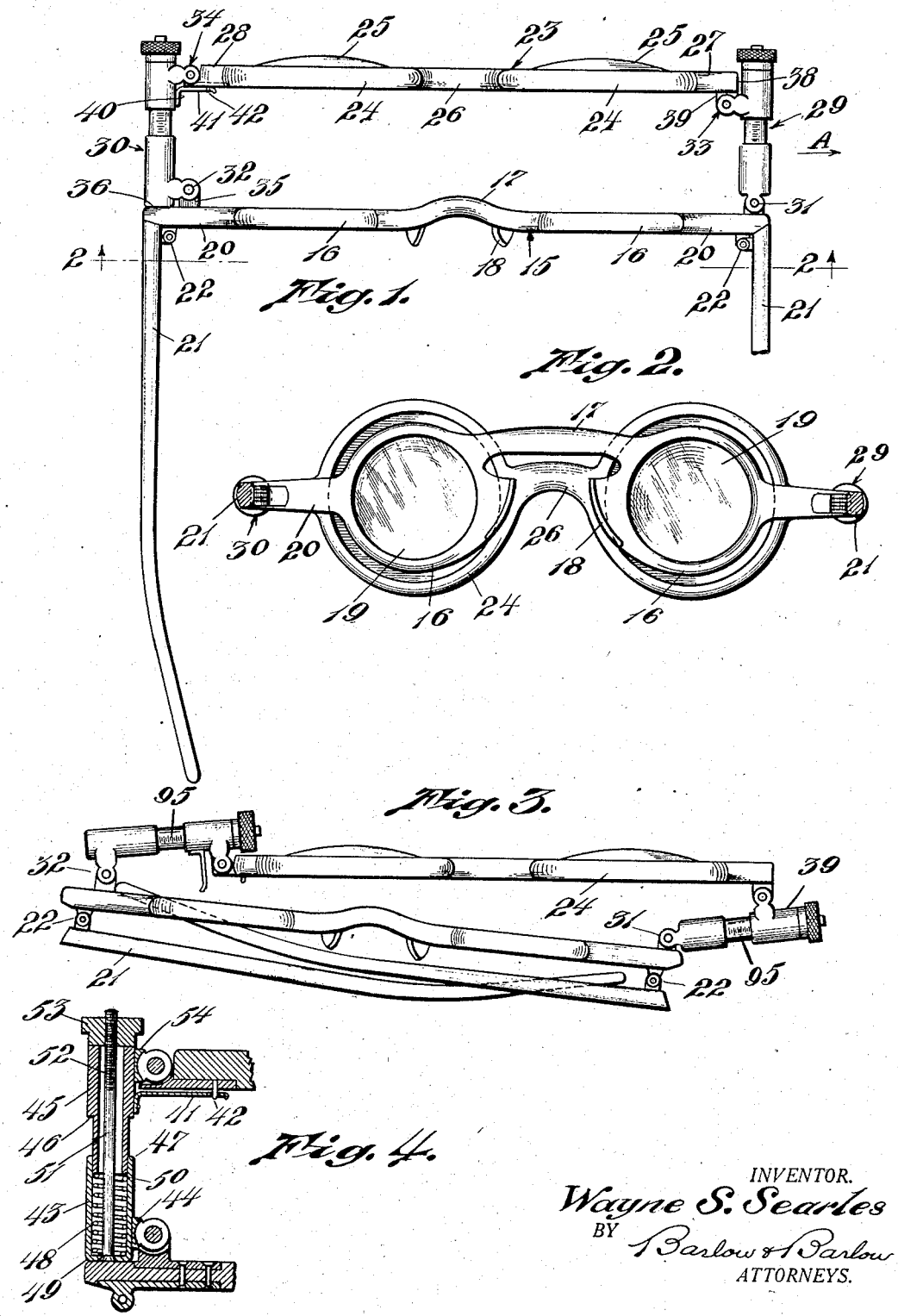

2,027,123

UNITED STATES PATENT OFFICE 2,027,123

SPORT OPHTHALMIC MOUNTING

Wayne S. Searles, Providence, R. I., assignor to Universal Optical Corporation, Providence, R. I., a corporation of Rhode Island Application February 20, 1933, Serial No. 657,555

6 Claims. (Cl. 88—41)

This invention relates to an ophthalmic mounting commonly referred to as a "sport frame" or "sport glass", and has for one of its objects the provision of a relatively simple construction for adjustably mounting two pair of lenses, that distant objects may be viewed in greater detail than with the naked eye.

Another object of the invention is the provision of a pair of complete frames each having a pair of lenses mounted therein, which frames as a whole may be adjusted one relative to the other for obtaining different focuses for accommodating of the eyes of different wearers and magnifying the field of vision.

Another object of the invention is the provision of two pair of lenses which may be adjusted for focusing and which also may be collapsed to bring the plane of the lenses into closely adjacent parallel planes for storage and conveniently positioning the lenses in the pocket for transportation.

Another object of the invention is the provision of means for swingably mounting pairs of lenses one with reference to the other, with the provision of stops for determining one position of swinging movement of the lenses with reference to the other.

Another object of the invention is the provision of a swinging mounting which will be limited in one predetermined position of swinging movement and which may be locked in this position against a return to collapsed position.

A further object of the invention is the provision of a construction which may be equipped with markings that predetermined positions of adjustment may be acquired, and that when moved from the predetermined position may be returned thereto.

With these and other objects in view, the invention consists of certain novel features of construction, as will be more fully described, and particularly pointed out in the appended claims.

In the accompanying drawings:

Fig. 1 is a top plan view of the ophthalmic mounting in working position with one of the temples broken away.

Fig. 2 is a view looking in the direction of the arrows on line 2—2 of Fig. 1 with the temples in section.

Fig. 3 is a top plan view of the construction of Fig. 1 in partially folded position.

Fig. 4 is a sectional view through one of the posts for spacing apart the lens frames.

Fig. 5 is a top plan view of a modified construction with the temples broken away.

Fig. 6 is a top plan view of the structure shown in Fig. 5 in folded position.

Fig. 7 is a sectional view through the post of Figs. 5 and 6 and portions of the frame to which the post is connected.

Fig. 8 is a top plan view of a modified construction of post showing the end portions of the lens frames with the catch for locking the post in position.

Fig. 9 is a fragmental top plan view of a still further modified construction showing a post as jointed intermediate its ends.

Fig. 10 is a fragmental top plan view with posts shown in section of a still further modified construction.

Fig. 11 is a fragmental top plan view with posts shown in section of a still further modified construction.

Fig. 12 is a sectional view of a still further modified form of post which may be used for connecting the frames one with the other.

It frequently is desirable to provide "sport glasses" for use at large gatherings such as prize fights, football or baseball games or like sports where one must be located a considerable distance away from the play or action of the event witnessed, and in order to magnify the normal vision in an inexpensive construction I have provided a mounting for two pair of lenses such that the lenses may be relatively movable, one with reference to the other, and I have also arranged this mounting in such a way that the lenses may be moved to a so-called collapsed position that a minimum amount of space may be taken up by the mounting when it is desired to place the same in the pocket or other convenient place for transportation when not in use, and the following is a detailed description of the present embodiment of this invention illustrating a preferred means by which these advantageous results may be accomplished.

With reference to the drawings I provide an inner frame 15 which consists of the usual lens rims 16 joined by a bridge 17 and provided with nose rests or guards 18. In the rims there are located the usual pair of lenses 19, and projecting laterally from the opposite sides of the frame are end pieces 20 to which temples 21 are hinged as at 22 that these temples may fold one upon the other in the usual manner of spectacles.

An outer frame designated generally 23 consists of lens rims 24 in which lenses 25 are mounted. These rims are secured together by a bridge piece 26 and as this frame is in spaced relation to the face, nose guards are not required. End pieces 27 and 28 project laterally from either side of the frame 23, and to these end pieces of the frames 15 and 23 I secure posts designated generally 29 and 30, which posts are hinged to the frame 15 as at 31 and 32 and are hinged to the frame 23 as at 33 and 34.

The hinged relation of these posts is such that the posts may both swing in the direction of the arrow A about their hinged connections 31 and 32 as will be observed from Fig. 3, and the hinge relation of the posts with reference to the frame 23 is such that in this movement the frame 23 will swing with reference to the posts as illustrated in Fig. 3, while the frames approach one another maintaining the relationship of generally parallel planes.

The post 30 is so hinged by reason of the ear 35 secured to the end piece 20 that its end 36 will abut the end piece to prevent the swinging of the post in a direction opposite to the arrow A, while this same relation of an ear 37 will cause the end 38 of the outer frame to abut the portion 39 of the post 29 adjacent thereto, and prevent its swinging with reference to the frame. In order that the position illustrated in Fig. 1 may be maintained against this swinging movement in the direction of the arrow A, I have provided a lock designated generally 40 which consists of a resilient finger 41 to snap over a pin 42, the resilient finger being illustrated as carried by the post and the pin being carried by the frame, although this relation may be reversed as will be readily apparent from Fig. 8.

The posts which I have shown are adjustable. The post construction may be more clearly seen in Fig. 4 wherein there is a tubular member 43 to which one of the hinge parts 44 is connected and telescoping within the tubular member 43 is a second tubular member 45 having a shoulder 46 to engage the end 47 of the member 43 to limit its telescopic relation therewith. These telescopic members 43 and 45 are forced apart by helical spring 48 acting between the end 49 of the member 46 and the end 50 of the member 45. A rod 51 is secured in the closed end 49 and extends through both tubular members 43 and 45. This rod is provided with threads 52, and a nut 53 threadedly engages this threaded end of the rod by which the length of the post may be adjusted, the post being shortened by the nut 53 forcing the member 45 inwardly against the action of the spring and being lengthened by turning the nut to permit the spring to force the parts 43 and 45 outwardly. The member 45 is provided with a part 54 for mounting the hinge 34 thereon.

This adjustment is of such construction that the collapsing relation of the frames 15 and 23 may occur without disturbing this adjustment and thus when once adjusted may remain in this adjusted position although folded or unfolded as occasion requires such as for transportation or placing the same within the pocket.

In Fig. 8 I have illustrated a still different adjustment of the post which consists in the provision of a nut 62 inserted in a slot 63 within the member 45 of the post such as shown in Fig. 4 and in this construction no spring is required as a movement of the nut 62 in one direction will cause the part 45 to move outwardly relative to the part 43 while a movement in the opposite direction will cause the opposite relative movement of these telescoping parts.

In some instances an adjustment may be provided in the post by the construction as illustrated in Fig. 11 wherein two threaded studs 55 and 56 are hingedly mounted as at 57 and 58 to the respective frames, one stud being provided with a right-hand thread and the other stud being provided with an opposite, or left-hand thread while a tube 59 threaded corresponding to the opposite threads on the studs telescopes with each of the studs and by rotation causes the post to be lengthened or shortened as desired. In this instance the posts are held in the desired position by reason of spring catches 60 snapping into notches 61 provided in the eyes at the ends of the studs 55 and 56 so that as they reach a predetermined desired position these catches will enter the notches and hold them in this desired position until the strength of the resilience of the catches 60 are overpowered for the collapsing of the frames one on the other.

In Fig. 12 I have shown the post consisting of two members 64 and 65 in telescoping relation with the pin 66 sliding in the slot 67 to limit their relative movement. These members are moved to different positions in which they are held by reason of a threaded stud 68 extending through the end 69 of the member 65 where a handle or rotating part 70 is mounted for turning the stud 68 as desired, to thread in or out of the threaded bore 71 of the member 64. Suitable hinge connections are provided as at 72 and 73 on this post.

In the post illustrated in Fig. 9 I have provided two members 74 and 75 which are hinged at one end to the frames and are hinged together as at 76 so that a movement about the hinge 76 with the arm 74, 75 swinging either inwardly or outwardly will permit a collapse or movement of the frames toward each other.

In Fig. 10 I have shown a series of telescopic tubes 77 and 78 which are secured to the frames 23 and 15. Tubes 79 and 80 telescope therewith and also telescope inside of tube 81 in permitting the frames to move in a straight line motion, one toward the other. These tubes are forced apart by a spring 82 which houses within the tubes when telescoped into folded position.

A still different modification of a post is illustrated in Figs. 5, 6 and 7. In this illustration the post consists of two members, one member 83 being rigidly secured to the outer frame 23 while the other member 84 is hinged to this member 83 and is slidable through an opening 85 in the frame 15.

This opening is suitably bushed as at 86 and through the bushing 86 a latch 87 extends and is forced into engagement with the post by means of a spring 88 housing within a suitable socket 89 in the frame 15 and which is held in place by a cap 90. The latch may engage any selected notch 91 suitably provided along the edge of the member 84 of this post. The construction is such that the posts may be moved outwardly until the desired notch is selected that the proper focus may be obtained, and when it is desired to collapse and fold the mounting the frames are forced together by manual pressure with the posts sliding inwardly until the part 83 is positioned within the opening 85 whereupon each post 84 may be swung about its hinge 92 which connects the parts 83 and 84 together that it may assume the relation illustrated in Fig. 6. The abutments at the ends of the members 83 and 84 contact as at 93 and prevent outward movement of these members. In this relation of frame the end pieces 94 will be extended and carried rearwardly in order that the temples 21 may fold over the members 84 when in the relation illustrated in Fig. 6 thus enabling a compact relation to be secured.

In the constructions illustrated in Figs. 1, 2, 3, 4, 8, 11 and 12 an adjustment of the frames relative to each other may be secured to any desired point as indicated by graduations 95 while this adjustment is independent of the folding relation of the frames so that the adjustment is not disturbed upon folding. In some instances one side may be adjusted differently than the other or by means of the graduation both may be adjusted alike.

In the constructions illustrated in Figs. 5, 6, 8, 9 and 10 the frames are permitted to move toward each other in a direction at right angles to the general plane in which they lie, with the exception of Figure 9 which has no adjustment. Adjustment in this case is disturbed although the vertical movement of the parts toward each other is a feature to be desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a frame for a pair of lenses, a second frame for a pair of lenses, adjustable telescoping posts, spring means tending to extend said telescoping posts, and hinge means for attaching said posts at their ends to said frames to permit swinging of said posts relative to said frames, that said frames may move toward each other in parallel planes.

2. In an ophthalmic mounting, a frame for a pair of lenses, a second frame for a pair of lenses, adjustable posts, hinge means at the opposite ends of said posts for securing said frames together in spaced parallel planes, each of said posts comprising a plurality of telescoping members and means including threaded parts within the posts for relatively moving said members to the desired position.

3. In an ophthalmic mounting, a frame for a pair of lenses, a second frame for a pair of lenses, adjustable posts, and hinge means for attaching said posts to said frames to permit swinging of said posts relative to said frames that said frames may move toward or away from each other in parallel planes, and means to limit the movement away from each other when at a maximum distance, and interlocking means arranged to prevent swinging at one of said hinges for locking the lenses in this position of maximum position.

4. In an ophthalmic mounting a lens frame, lenses therein, temples hinged to said frame to extend rearwardly therefrom and to swing toward each other to folded position, adjustable posts hinged to the ends of said frame to extend forwardly therefrom and both swing in the same direction toward the plane of said lenses in said frame, one of said posts being prevented from swinging in the opposite direction by reason of abutting against a portion of said frame, a second frame hingedly secured to the outer ends of said posts said posts being swingable with reference thereto, the other of said posts being prevented from swinging in one direction by reason of the abutting relation with said second frame.

5. In an ophthalmic mounting a lens frame, lenses therein, temples hinged to said frame to extend rearwardly therefrom and to swing toward each other to folded position, posts hinged to the ends of said frame to extend forwardly therefrom and both swing in the same direction toward the plane of said lenses in said frame, one of said posts being prevented from swinging in the opposite direction by reason of abutting against a portion of said frame, a second frame hingedly secured to the outer ends of said posts, said posts being swingable with reference thereto, the other of said posts being prevented from swinging in one direction by reason of the abutting relation with said second frame, and means in said posts to adjust their length, and means to lock the frame in extended position with the posts in substantially this abutting relation.

6. In an ophthalmic mounting, a frame for a pair of lenses, a second frame for a pair of lenses, adjustable telescoping posts, spring means within said posts tending to extend them, hinge means for attaching said posts at their ends to said frames to permit swinging of said posts relative to said frames by securing said frames together in spaced parallel planes, each of said posts comprising a plurality of telescoping members, and means including threaded parts within said posts for relatively moving said members to the desired position.

WAYNE S. SEARLES.